G. UNTERBERG.
INTERRUPTER FOR MAGNETO ELECTRIC IGNITERS.
APPLICATION FILED SEPT. 26, 1910.
1,053,248.
Patented Feb. 18, 1913.
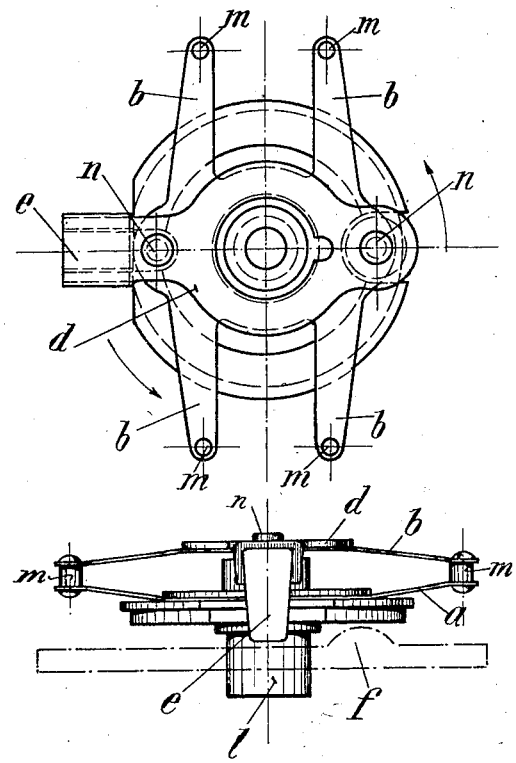

UNITED STATES PATENT OFFICE.

GUSTAV UNTERBERG, OF FRANKFORT-ON-THE-MAIN, GERMANY.

INTERRUPTER FOR MAGNETO-ELECTRIC IGNITERS.

1,053,248. Specification of Letters Patent. Patented Feb. 18, 1913.

Application filed September 26, 1910. Serial No. 583,932.

*To all whom it may concern:*

Be it known that I, GUSTAV UNTERBERG, engineer, a citizen of the German Empire, residing at Frankfort-on-the-Main, Kingdom of Prussia, Germany, have invented certain new and useful Improvements in Interrupters for Magneto-Electric Igniters, of which the following is a specification.

This invention relates to interrupters for magneto-electric igniters and consists in certain improvements on the device shown in Letters Patent No. 981,599, issued January 10, 1911, the object of the present improvements being to produce a construction by which the parts will be more compactly arranged and in which the spring by which the contacts are held together will be possessed of increased strength.

The invention is fully illustrated in the accompanying drawings and is hereinafter fully described, the novel features being subsequently pointed out in the claims at the end of the description.

In the accompanying drawings, Figure 1 is a diametrical section through the rotating member of the interrupter. Fig. 2 is a plan view of the same. Fig. 3 is an elevation of the rotary member of the interrupter, indicating by dotted lines the position of the fixed member or cam upon the casing.

In carrying out my present invention, I construct a spring in two members $a$ and $b$, each of which consists of a plate having four outstanding arms, as shown most clearly in Fig. 2, the ends of the said arms of the upper plate $b$ being connected to the ends of the arms of the lower plate $a$ by rivets $m$ as clearly shown. The lower plate $a$ of the spring is in practice clamped between annular flanges or disks extending from the hub members $l$ $l'$ respectively, the hub member $l'$ being threaded into the member $l$ and the hub thus constructed being secured upon the armature shaft of a magneto in any suitable manner.

The interrupter lever $d$ extends over and rests upon the upper member $b$ of the spring and is supported at one end by a pin $g$ which may rest in a recessed member $h$ on the disk or flange of the hub member $l$. The said pin $g$ and the contact pin $i$, arranged at the opposite side of the spring, are secured to the lever $d$ by rivets $m$ as shown, the lever being extended beyond the contact pin $i$ and provided at its extended end with a depending lug or tooth $e$ which, in the operation of the device, is adapted to ride over a projection or cam $f$ on the interrupter casing. The contact pin $i$ normally rests upon a contact pin $k$ which is carried by the hub member $l$, and the said contact pin $k$ is insulated from the said hub member and is designed to be connected through a suitable conductor with one pole of a magneto.

In practice, the opposite poles of the magneto will be connected with or laid upon the hub member $l$ and the upper spring member, so that the current will pass through the springs $a$ and $b$ to the contact pin $i$ and thence to the pin $k$ so as to close the circuit. As the device rotates, the dog or tooth $e$ will be brought against the cam or projection $f$ so as to ride over the same and be thereby raised so that the interrupter lever and its contact pin $i$ will be lifted away from the contact pin $k$ and the circuit thereby broken so as to produce a spark in the igniter in the usual manner.

By reason of the construction herein disclosed, I am enabled to diminish the space occupied by the spring and thereby reduce the height of the entire interrupter to a very appreciable degree. Furthermore, the spring will possess greater resiliency than in the prior arrangement so that while it will yield freely to the strain placed thereon by the cam $f$ it will, at the same time, respond very promptly so as to hold the contact pins normally together, and the period during which the circuit is broken will be shortened so that possible damage to the igniter is obviated. Furthermore, the strain is more equally distributed through the entire structure of the spring and as the lever is attached to the upper member or portion of the spring it has greater power to hold the dog or lug $e$ in a path which includes the cam $f$ so that the operation of the device is rendered exceedingly accurate.

What I claim is:—

1. In an interrupter for magneto-electric igniters, the combination with a circuit-breaking lever mounted to rotate and to swing at an angle to its plane of rotation, of a spring having upper and lower leaves, the lower leaf fixed with respect to said lever but rotatable therewith and the upper leaf secured to said lever to swing with it, and a stationary cam adapted to be engaged by the free end of said lever, whereby the latter is raised for breaking the circuit.

2. In an interrupter for magneto-electric igniters, the combination with a circuit breaking lever mounted to rotate and to swing at an angle to its plane of rotation, of a spring having upper and lower leaves, the lower leaf fixed with respect to said lever but rotatable therewith and the upper leaf secured to said lever to swing with it, a lug on the free end of said lever projecting past the lower leaf of the spring, and a cam adapted to be engaged by said lug, whereby the lever is raised for breaking the circuit.

3. An interrupter comprising upper and lower leaf springs having their ends rigidly secured together, a lever secured upon the upper member of the spring and having a free end projecting beyond the side of said member, a lug depending from said free end of the lever, and a fixed cam in the path of said lug.

In testimony whereof I affix my signature, in presence of two witnesses.

GUSTAV UNTERBERG.

Witnesses:
K. WENTZEL,
F. WENTZEL.

Copies of this patent may be obtained for five cents each, by addressing the "Commissioner of Patents, Washington, D. C."